Patented Apr. 6, 1948

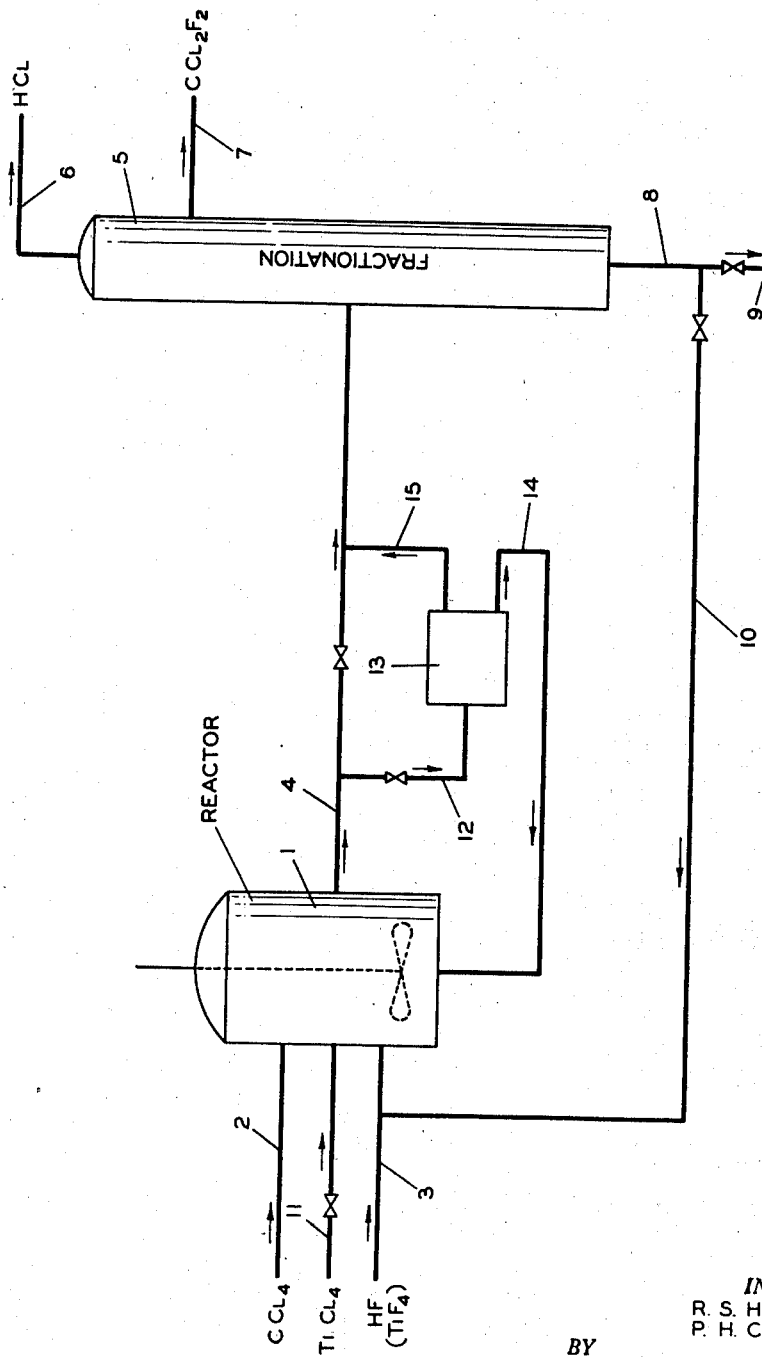

2,439,299

UNITED STATES PATENT OFFICE 2,439,299

PRODUCTION OF HALOGENATED HYDROCARBONS CONTAINING FLUORINE

Roger S. Hovey, Charleston, W. Va., and Paul H. Carnell, Bartlesville, Okla., assignors to Phillips Petroleum Company, a corporation of Delaware Application July 26, 1946, Serial No. 686,374

12 Claims. (Cl. 260—653)

This invention relates to the production of organic fluorine compounds, more particularly fluorinated hydrocarbons. In a more specific aspect it relates to the production of halogenated hydrocarbons containing fluorine and another halogen from halogenated hydrocarbons containing a plurality of atoms of halogen other than fluorine. In one aspect it relates to the production of mixed fluoro-chloro-methane and -ethane from corresponding chlorinated hydrocarbons, for example the production of dichlorodifluoromethane and/or trichloromonofluoromethane from carbon tetrachloride, dichloromonofluoromethane from chloroform and dichlorotetrafluoroethane from hexachloroethane.

The principal object of the present invention is to fluorinate hydrocarbon derivatives. Another object is to replace organically bound chlorine, bromine and/or iodine atoms with fluorine atoms. Another object is to produce fluorinated hydrocarbon derivatives. Another object is to produce organic fluorine compounds useful as refrigerants and dispersants. Another object is to provide a novel fluorinating agent. Another object is to provide an improved method of manufacturing dichlorodifluoromethane. Another object is to provide an improved method of producing trichloromonofluoromethane. Still another object is to provide an improved method of producing dichloromonofluoromethane. Another object is to provide an improved method of making dichlorotetrafluoroethane. Many other objects will more fully appear from the following description.

The accompanying drawing portrays diagrammatically one specific embodiment of the present invention. The drawing is a simplified flow diagram of one arrangement of apparatus for producing dichlorodifluoromethane from carbon tetrachloride.

Broadly the present invention comprises treating organic chlorine, bromine and/or iodine compounds with a novel fluorinating agent to replace halogen atoms of these compounds with fluorine. The novel fluorinating agent of this invention comprises substantially anhydrous hydrofluoric acid containing a minor proportion of titanium tetrafluoride. The titanium tetrafluoride acts as a promoter for the hydrogen fluoride, the mixture functioning as a new and improved catalyst in an old reaction, it being old to use other promoters, particularly antimony halides, in conjunction with hydrofluoric acid in this type of reaction.

Among the products obtainable by the process of this invention are low-boiling fluoro-chloroalkanes that are valuable as refrigerants and dispersants. In addition to having properties that make them suitable as refrigerants and dispersants, these compounds have faint, nonobjectionable odors and are nontoxic and noninflammable. Several fluorochloroalkanes used as refrigerants are listed in the following table:

| Formula | Boiling Point, °C. | Trade Name |
|---|---|---|
| $CCl_2F_2$ | −29.8 | Freon. |
| $CCl_3F$ | 23.7 | F-11. |
| $CHCl_2F$ | 8.9 | F-21. |
| $C_2Cl_2F_4$ | 3.5 | F-114. |

Our invention is a process of producing halogenated hydrocarbons, particularly the alkanes and especially the lower alkanes such as methane and ethane, containing fluorine and another halogen, which comprises contacting a halogenated hydrocarbon containing a plurality of atoms of halogen other than fluorine with a fluorinating agent comprising a major proportion of substantially anhydrous hydrofluoric acid and a minor proportion of titanium tetrafluoride under conditions such that at least one, but usually less than all, of said atoms of halogen other than fluorine is replaced with fluorine.

For example in accordance with one embodiment of our invention, dichlorodifluoromethane, $CCl_2F_2$, and/or trichloromonofluoromethane, $CCl_3F$, are prepared by treating carbon tetrachloride with a fluorinating agent comprising substantially anhydrous hydrofluoric acid containing a minor proportion of titanium tetrafluoride. Similarly, dichloromonofluoromethane may be produced from chloroform, and dichlorotetrafluoroethane may be produced from hexachloroethane in accordance with our invention. These examples are illustrative only and are by no means exclusive, since our invention may be employed to effect replacement of any number of atoms of halogen other than fluorine in a halogenated hydrocarbon with fluorine. Our invention is chiefly applicable to replacement of chlorine with fluorine. However, it may be employed to replace bromine and/or iodine with fluorine.

The fluorinating agent of the present invention comprises a major proportion of substantially anhydrous hydrofluoric acid and a minor proportion of titanium tetrafluoride. Usually the catalyst consists essentially of, i. e. the only active elements of the catalyst are, hydrogen fluoride and titanium tetrafluoride.

The proportions of hydrogen fluoride and titanium tetrafluoride employed may vary within wide limits. The preferred concentration of titanium tetrafluoride in the fluorinating agent is from 1 to 10 weight per cent based on the weight of titanium tetrafluoride and hydrogen fluoride. Concentrations of titanium tetrafluoride outside these limits may, however, be used if desired. It is ordinarily not desirable to use less than 1 per cent of titanium tetrafluoride because the promoting action at such concentrations is not sufficient. More than 10 per cent of titanium tetrafluoride may be used if desired. For example concentrations ranging from 10 per cent up to 50 per cent of titanium tetrafluoride, based on the weight of titanium tetrafluoride plus hydrogen fluoride, may be used. Ordinarily, however, the promoting action is not sufficiently enhanced by the use of concentrations of titanium tetrafluoride above 10 per cent to make use of such concentrations economically feasible. In fact the promoting activity appears to be as great within the 1 to 10 per cent range as it is at concentrations above 10 per cent.

The reaction temperature employed may vary over wide limits. We use temperatures above atmospheric and we prefer to use temperatures within the range of from 50 to 200° C. Likewise the pressure used may vary widely but is preferably sufficiently high to maintain the reaction mixture in the liquid phase. Ordinarily the pressure is such that substantially all of the reactants and reaction products are maintained in the liquid phase. The pressure required to accomplish this will depend upon the temperature and the proportions of the various ingredients charged to the reaction zone. The reaction is ordinarily carried out in a closed pressure-resisting vessel of such size that the major proportion and usually substantially all of the materials are in the liquid phase. The relative amounts of materials in the liquid phase and in the gas space thereabove will depend upon the relative volumes of the reaction vessel and the liquid charge. In view of the much greater concentration of material in the liquid phase than in the gaseous phase, nearly all may be in the liquid phase even though the reaction vessel has a volume several times larger than the volume of the liquid charge.

While liquid phase operation is preferred, operation with the reactants and/or reaction products and catalyst in the gas phase is within the scope of our invention in its broader aspects.

The reaction time during which the reactants are contacted with the fluorination agent will depend upon a number of factors including the particular raw material and the specific product desired. In general a contact time of from 5 to 25 minutes is satisfactory.

Although the ratio of fluorinating agent to halogenated hydrocarbon in which fluorine substitution is to be effected, may vary within a wide range, it is preferably greater than 1:1 by weight. It may range from such a ratio upwardly to as high as 10:1 or even higher. However economic considerations may prevent or make undesirable use of a range greater than say 7:1 or 8:1.

While the present description gives directions which will enable any person skilled in the art to practice our invention, optimum reaction conditions for obtaining a given product from a given reactant can readily be determined by trial.

Ordinarily our invention is carried out under substantially anhydrous or completely anhydrous conditions. By "substantially anhydrous" we mean the presence of not more than about 1.0 weight per cent of water in the reaction zone.

Numerous types of apparatus are suitable for carrying out our invention. Mechanically agitated or jet agitated contactors may be used, or the halogenated hydrocarbon may be dispersed and allowed to rise through the body of the catalyst. Intimate contacting of the catalyst and the reactant is desirable. In many cases the reaction mixture will comprise two phases, namely, a hydrofluoric acid phase and a halogenated hydrocarbon phase, and it will be necessary to provide means for intimately contacting these two phases.

While our invention may be carried out in a batchwise manner, we prefer continuous operation. Continuous operation may be practiced by continuously charging to a suitable pressure-resisting vessel the original halogenated hydrocarbon and the fluorinating agent of our invention, maintaining these materials under reaction conditions for a suitable length of time, continuously withdrawing from the reaction zone the resulting reaction mixture, continuously recovering the fluorinated hydrocarbon product and recycling unreacted and partially reacted material as well as catalyst to the reaction zone. Any conventional apparatus for conducting reactions involving anhydrous or substantially anhydrous hydrofluoric acid, such as the equipment commonly used for alkylating isoparaffins with olefins with this acid, may be used. Suitable recycle arrangements for the fluorinating agent, for unreacted materials, and for other components of the reaction effluent may be provided as desired.

In one embodiment of our invention which is especially desirable in continuous operation, the fluorinating agent of our invention is prepared by adding titanium tetrachloride to liquid anhydrous hydrofluoric acid which converts the titanium tetrachloride to the tetrafluoride in situ. Since titanium tetrachloride is normally a liquid, whereas titanium tetrafluoride is normally a solid, difficulties occasioned by the addition of a solid to a liquid under pressure are thus obviated. When this mode of operation is employed, the titanium tetrachloride and the hydrofluoric acid are preferably separately introduced to the reaction zone. The proportions of the hydrofluoric acid and the titanium tetrachloride should be such that after reaction of all of the titanium tetrachloride with the hydrofluoric acid to form titanium tetrafluoride there is present a major proportion of hydrofluoric acid and a minor proportion of titanium tetrafluoride. The titanium tetrafluoride goes into the liquid phase under the conditions employed. This may be due to the use of a temperature above the melting point of titanium tetrafluoride in the reaction zone, but it is probably due mainly to the fact that the titanium tetrafluoride dissolves in the hydrofluoric acid as rapidly as it is formed. However both factors may be involved.

While formation of titanium tetrafluoride "in situ" in the manner just described is often preferred, preparation of fluorinating agent of our invention by direct mixing of titanium tetrafluoride and hydrofluoric acid is within the intended scope of our invention.

Referring to the accompanying drawing, carbon tetrachloride and anhydrous hydrofluoric acid containing a minor proportion of titanium tetrafluoride are passed to a reactor 1 via lines 2 and 3, respectively. In reactor 1 these components are intimately contacted under the reaction conditions previously described. The conditions are preferably so controlled that products more highly fluorinated than dichlorodifluoromethane are not obtained in substantial amounts. The reactor effluent is passed via line 4 to a fractionator or series of fractionators designated by reference numeral 5, from which are withdrawn a low-boiling fraction comprising hydrogen chloride leaving via line 6, an intermediate fraction comprising dichlorodifluoromethane, the chief product of the process, leaving via line 7, and a kettle residue comprising hydrofluoric acid, titanium tetrafluoride, and unreacted or incompletely reacted material. This kettle residue is withdrawn via line 8 and may be withdrawn from the system via line 9 but preferably is recycled, at least in part via line 10 to the reactor 1.

If it is desired to form titanium tetrafluoride "in situ" in the manner described above, titanium tetrachloride and anhydrous hydrofluoric acid are separately introduced to the reactor 1 via lines 3 and 11, respectively.

If the proportions of the materials fed to reactor 1 are such that two phases exist in the effluent, it may be passed via line 12 to a settling zone 13 where it is settled into a hydrofluoric acid phase which may be recycled to reactor 1 via line 14 and a halogenated hydrocarbon phase which may be passed via line 15 to the fractionation system 5.

In an alternative arrangement the reactor effluent may be passed to a flash chamber (not shown) in which a mixture of hydrogen chloride and dichlorodifluoromethane are flashed from the reactor effluent. The dichlorodifluoromethane is subsequently freed of hydrogen chloride by fractionation and/or washing with alkali, or in any other suitable manner.

In still another alternative arrangement, hydrogen chloride and dichlorodifluoromethane are separately removed from the reactor effluent by a two-stage flashing operation.

It may often be desirable to pass a portion or all of the separated catalyst to purification or regeneration step wherein the catalyst is recovered in pure form for recycle to the reactor. In this way the gradual loss of activity of the catalyst which normally occurs may be counteracted. The regeneration may be conducted in any suitable way, as for example by distilling off HF and other products and recovering the HF in any suitable way, and recovering TiF₄ from the residue by extraction, volatilization or the like.

*Example*

A 1.5-liter Monel bomb was charged with 525 grams of anhydrous hydrofluoric acid, 30 grams of titanium tetrafluoride, and 160 grams of carbon tetrachloride. The bomb was then closed and heated to 127° C. by means of an external electric heater, and the contents were agitated for 15 minutes by the use of a platform rocker. Throughout the treatment the bomb remained closed and the pressure was allowed to build up. Most of the material remained in the liquid phase. At the end of the reaction period, part of the organic material was removed from the bomb and distilled. About 60 volume per cent boiled in the range of −30 to +25° C. This fraction had the characteristic faint odor of dichlorodifluoromethane.

Many advantages are obtained by means of the present invention. The invention provides a simple, economical and effective way of producing fluorinated hydrocarbons, particularly the mixed fluoro-chloro-alkanes typified by dichlorodifluoromethane, dichloromonofluoromethane and dichlorotetrafluoroethane. The use of titanium tetrafluoride as a promoter is advantageous as compared with the antimony halides which have been used heretofore. Titanium tetrafluoride is cheap since it can be made from titanium tetrachloride. Yields are better and the process is more clean cut when titanium tetrafluoride is used than when the antimony halides of the prior art are employed to promote the hydrofluoric acid. Many other advantages of my invention will be obvious to those skilled in the art from a consideration of the foregoing description.

We claim:

1. The process of producing halogenated hydrocarbons containing fluorine and another halogen which comprises contacting a halogenated hydrocarbon containing a plurality of atoms of halogen other than fluorine with a fluorinating agent comprising a major proportion of substantially anhydrous hydrofluoric acid and a minor proportion of titanium tetrafluoride under conditions such that at least one of said atoms of halogen other than fluorine is replaced with fluorine.

2. The process of producing halogenated hydrocarbons containing fluorine and another halogen which comprises contacting a halogenated hydrocarbon containing a plurality of atoms of halogen other than fluorine with a fluorinating agent comprising a major proportion of substantially anhydrous hydrofluoric acid and from 1 to 10 weight per cent, based on the weight of titanium tetrafluoride and hydrofluoric acid, of titanium tetrafluoride under conditions such that at least one, but less than all, of said atoms of halogen other than fluorine is replaced with fluorine.

3. The process of producing halogenated hydrocarbons containing fluorine and another halogen which comprises contacting a halogenated hydrocarbon containing a plurality of atoms of halogen other than fluorine with a fluorinating agent consisting essentially of a major proportion of substantially anhydrous hydrofluoric acid and from 1 to 10 weight per cent, based on the weight of titanium tetrafluoride and hydrofluoric acid, of titanium tetra fluoride under conditions such that at least one, but less than all, of said atoms of halogen other than fluorine is replaced with fluorine.

4. The process of producing halogenated hydrocarbons containing fluorine and another halogen which comprises contacting a halogenated hydrocarbon containing a plurality of atoms of halogen other than fluorine with a fluorinating agent consisting essentially of substantially anhydrous hydrofluoric acid and from 1 to 10 weight per cent, based on the weight of titanium tetrafluoride and hydrofluoric acid, of titanium tetrafluoride at a temperature of from 50 to 200° C. and under other conditions such that at least one, but less than all, of said atoms of halogen other than fluorine is replaced with fluorine.

5. The process of producing halogenated hydrocarbons containing fluorine and another halogen which comprises contacting a halogenated hydrocarbon containing a plurality of atoms of halogen other than fluorine with a fluorinating agent consisting essentially of substantially anhydrous hydrofluoric acid and from 1 to 10 weight per cent, based on the weight of titanium tetrafluoride and hydrofluoric acid, of titanium tetrafluoride at a temperature of from 50 to 200° C. and an elevated pressure sufficient to maintain liquid phase for a period of time such that at least one, but less than all, of said atoms of halogen other than fluorine is replaced with fluorine.

6. The process of producing halogenated hydrocarbons containing fluorine and another halogen which comprises contacting a halogenated hydrocarbon containing a plurality of atoms of halogen other than fluorine with a fluorinating agent consisting essentially of substantially anhydrous hydrofluoric acid and from 1 to 10 weight per cent, based on the weight of titanium tetrafluoride and hydrofluoric acid, of titanium tetrafluoride at a temperature of from 50 to 200° C. and at an elevated pressure sufficient to maintain liquid phase for a period of time of from 5 to 25 minutes such that at least one, but less than all, of said atoms of halogen other than fluorine is replaced with fluorine.

7. The process of claim 6 wherein the ratio of said fluorinating agent to said halogenated hydrocarbon containing a plurality of atoms of halogen other than fluorine is greater than 1:1 by weight.

8. The process of producing dichlorodifluoromethane which comprises contacting carbon tetrachloride with a fluorinating agent consisting essentially of substantially anhydrous hydrofluoric acid and from 1 to 10 weight per cent, based on the weight of titanium tetrafluoride and hydrofluoric acid, of titanium tetrafluoride at a temperature of from 50 to 200° C. and a pressure sufficient to maintain liquid phase for a period of time of from 5 to 25 minutes, the ratio of said fluorinating agent to said carbon tetrachloride being greater than 1:1 by weight, and thereby effecting replacement of two atoms of chlorine in said carbon tetrachloride with two atoms of fluorine to form dichlorodifluoromethane.

9. The process of producing dichloromonofluoromethane which comprises contacting chloroform with a fluorinating agent consisting essentially of substantially anhydrous hydrofluoric acid and from 1 to 10 weight per cent, based on the weight of titanium tetrafluoride and hydrofluoric acid, of titanium tetrafluoride at a temperature of from 50 to 200° C. and a pressure sufficient to maintain liquid phase for a period of time such that one of the atoms of chlorine in said chloroform is replaced with fluorine to form dichloromonofluoromethane.

10. The process of producing dichlorotetrafluoroethane from hexachloroethane which comprises contacting hexachloroethane with a fluorinating agent consisting essentially of substantially anhydrous hydrofluoric acid and from 1 to 10 weight per cent, based on the weight of titanium tetrafluoride and hydrofluoric acid, of titanium tetrafluoride at a temperature of from 50 to 200° C. and a pressure sufficient to maintain liquid phase for a period of time such that four of the atoms of chlorine in said hexachloroethane are replaced with fluorine to form dichlorotetrafluoroethane.

11. The process of producing dichlorodifluoromethane which comprises subjecting a mixture consisting of 525 parts by weight of anhydrous hydrofluoric acid, 30 parts by weight of titanium tetrafluoride, and 160 parts by weight of carbon tetrachloride to agitation at a temperature of 127° C. in a closed pressure-resisting reaction vessel at a pressure such that substantially all of the material is maintained in the liquid phase, for a period of time of 15 minutes, and recovering dichlorodifluoromethane from the resulting reaction mixture.

12. In a process of producing halogenated hydrocarbons containing fluorine and another halogen which comprises contacting a halogenated hydrocarbon containing a plurality of atoms of halogen other than fluorine with a fluorinating agent consisting essentially of a major proportion of substantially anhydrous hydrofluoric acid and a minor proportion of titanium tetrafluoride in a reaction zone under conditions such that at least one of said atoms of halogen other than fluorine is replaced with fluorine, the improved method of introducing said titanium tetrafluoride into the reaction zone which comprises forming it in situ by separately introducing liquid substantially anhydrous hydrofluoric acid and liquid titanium tetrachloride into the reaction zone, the proportions of said hydrofluoric acid and said titanium tetrachloride being such that upon reaction of all of said titanium tetrachloride with hydrofluoric acid to form titanium tetrafluoride there is present a major proportion of hydrofluoric acid and a minor proportion of titanium tetrafluoride.

ROGER S. HOVEY.
PAUL H. CARNELL.

REFERENCES CITED

The following references are of record in the file of this patent:

UNITED STATES PATENTS

| Number | Name | Date |
|---|---|---|
| 1,930,129 | Midgley et al. | Oct. 10, 1933 |
| 2,007,208 | Midgley et al. | July 9, 1935 |
| 2,062,743 | Daudt et al. | Dec. 1, 1936 |